United States Patent
Grosz et al.

(10) Patent No.: US 10,730,211 B2
(45) Date of Patent: Aug. 4, 2020

(54) METHOD AND APPARATUS FOR PROCESSING ELASTOMER COMPOSITE

(71) Applicant: Cabot Corporation, Boston, MA (US)

(72) Inventors: Ron Grosz, Andover, MA (US); Lawrence R. Gooch, Southport, NC (US)

(73) Assignee: Cabot Corporation, Boston, MA (US)

( * ) Notice: Subject to any disclaimer, the term of this patent is extended or adjusted under 35 U.S.C. 154(b) by 373 days.

(21) Appl. No.: 15/821,796

(22) Filed: Nov. 23, 2017

(65) Prior Publication Data

US 2018/0104870 A1    Apr. 19, 2018

Related U.S. Application Data

(62) Division of application No. 14/651,422, filed as application No. PCT/US2014/011278 on Jan. 13, 2014, now Pat. No. 9,855,686.

(Continued)

(51) Int. Cl.
| | |
|---|---|
| *B29C 43/34* | (2006.01) |
| *B29B 7/00* | (2006.01) |
| *B29B 7/56* | (2006.01) |
| *B29B 7/68* | (2006.01) |
| *B29B 7/72* | (2006.01) |
| *B29C 43/24* | (2006.01) |
| *B29C 33/02* | (2006.01) |
| *B29C 33/04* | (2006.01) |
| *B29C 43/46* | (2006.01) |
| *B29C 43/00* | (2006.01) |

(Continued)

(52) U.S. Cl.
CPC .............. *B29C 43/34* (2013.01); *B29B 7/007* (2013.01); *B29B 7/562* (2013.01); *B29B 7/566* (2013.01); *B29B 7/68* (2013.01); *B29B 7/724* (2013.01); *B29C 43/24* (2013.01); *B29C 43/245* (2013.01); *B29B 7/56* (2013.01); *B29B 7/564* (2013.01); *B29B 7/728* (2013.01); *B29C 33/026* (2013.01); *B29C 33/044* (2013.01); *B29C 43/006* (2013.01); *B29C 43/46* (2013.01); *B29K 2019/00* (2013.01); *B29K 2021/00* (2013.01); *B29K 2021/003* (2013.01)

(58) Field of Classification Search
None
See application file for complete search history.

(56) References Cited

U.S. PATENT DOCUMENTS

| | | |
|---|---|---|
| 2,097,290 A | 10/1937 | Parkin |
| 2,319,040 A | 5/1943 | Conklin |
| | (Continued) | |

FOREIGN PATENT DOCUMENTS

| | | |
|---|---|---|
| DE | 853345 | 10/1952 |
| DE | 756476 | 3/1953 |
| | (Continued) | |

OTHER PUBLICATIONS

The International Search Report and the Written Opinion of the International Searching Authority, or the Declaration of International Patent Application No. PCT/US2014/011278, dated Jul. 9, 2014.

*Primary Examiner* — Jeffrey M Wollschlager

(57) ABSTRACT

A method and configuration for automated operation of a two-roll mill. Also provided is a method for continuous or semi-continuous operation of a two-roll mill.

2 Claims, 11 Drawing Sheets

Related U.S. Application Data

(60) Provisional application No. 61/752,218, filed on Oct. 14, 2013, provisional application No. 61/752,223, filed on Jan. 14, 2013.

(51) Int. Cl.
    *B29K 19/00*    (2006.01)
    *B29K 21/00*    (2006.01)

(56) References Cited

U.S. PATENT DOCUMENTS

| | | | |
|---|---|---|---|
| 2,341,651 A | 2/1944 | Raschig | |
| 2,571,760 A | 10/1951 | Rathbun | |
| 2,652,590 A | 9/1953 | Sullivan et al. | |
| 2,954,580 A | 10/1960 | Hale et al. | |
| 3,083,404 A | 4/1963 | Lund | |
| 3,548,742 A | 12/1970 | Johannes | |
| 3,570,054 A * | 3/1971 | Seanor | B29C 43/245 425/337 |
| 3,740,177 A * | 6/1973 | Hoyt | B29C 43/22 425/115 |
| 3,985,488 A * | 10/1976 | Hoffmann | B02C 4/283 425/363 |
| 4,043,731 A * | 8/1977 | Kratzmann | B29C 43/24 425/366 |
| 4,605,309 A | 8/1986 | Albers | |
| 4,773,762 A | 9/1988 | Albers | |
| 5,245,861 A | 9/1993 | Limper et al. | |
| 5,333,951 A | 8/1994 | Wakoh | |
| 5,547,625 A | 8/1996 | Gleissner et al. | |
| 5,558,885 A * | 9/1996 | Herrera | A21C 3/02 425/239 |
| 6,330,024 B1 | 12/2001 | Vargo et al. | |
| 8,974,214 B2 * | 3/2015 | Kazama | B29C 43/22 425/378.1 |
| 9,073,247 B2 * | 7/2015 | Leblanc | B29C 43/24 |
| 2010/0188619 A1 * | 7/2010 | Otoshi | B29C 33/62 349/96 |
| 2011/0021664 A1 | 1/2011 | Wang et al. | |
| 2012/0172492 A1 | 7/2012 | Wang et al. | |
| 2013/0317137 A1 | 11/2013 | Thomasson et al. | |

FOREIGN PATENT DOCUMENTS

| | | |
|---|---|---|
| EP | 0480262 B1 | 4/1992 |
| WO | WO2011034581 A2 | 3/2011 |
| WO | WO2012080109 A1 | 6/2012 |

\* cited by examiner

METHOD AND APPARATUS FOR PROCESSING ELASTOMER COMPOSITE

This application is a Divisional of U.S. application Ser. No. 14/651,422 filed Jun. 11, 2015 which is a § 371 national phase application of and claims priority to International Patent Application No. PCT/US2014/011278, filed on 13 Jan. 2014, which claims priority to U.S. Provisional Patent Applications Nos. 61/752,223 and 61/752,218, both filed on 14 Jan. 2013.

BACKGROUND OF THE INVENTION

1. Field of the Invention

This invention relates to methods for processing elastomer composite on a roll mill and apparatus therefor.

2. Description of the Related Art

The horizontal two roll mill, often called an open mill, is commonly used in the rubber and plastics industry to masticate polymer-based materials. In general, the mill includes two cylindrical rolls situated in or close to a single horizontal plane. The rolls are hollow and may be heated or cooled. The two rolls need not be the same size and may be rotated at the same or different speeds.

In processing viscous materials such as elastomer composites, the material being worked on the mill may not adhere to the roll properly; in such cases, an operator must reach under the roll, grab the end of the material and bring it back to the surface of the roll or all the way up to the nip between the two rolls. In operating the mill, differences in surface speed between the two rolls causes the material to gather on one of rolls, where it is masticated by the other roll. Some rubbers may gather on the "wrong" roll initially, e.g., at startup, whereupon the operator must cut the material from the "wrong" roll and feed the end of the cut material over the proper roll.

Even normal mastication procedures may require the material to be cut and re-fed over the roll or into the nip between the rolls. For example, when elastomer composite is compounded, the material may be cut to allow a portion of the banded material to come off the roll away from the band. Depending on how the material is cut, the material may pick itself up and feed into the nip, or the operator may have to feed the end of the strip into the nip. This operation facilitates addition of fresh material to the mill and exchange of material between that banked over the nip and that banded on the roll. It is thought that this re-feeding of the material into the nip ensures adequate levels of mastication (see, e.g., "Safe Use of the Horizontal Two Roll Mill", New Zealand Department of Labour, 1984, available at www.osh.dol-.govt.nz/order/catalogue/tworollmill.shtml).

To achieve higher throughput, it is desirable to operate the roll mill at higher surface speeds. However, the need for a human operator reduces the maximum safe roll surface speed. Furthermore, it may be desirable to automate operation of the roll mill even at lower speeds. However, the roll mill must be configured to operate without manual manipulation of the material being processed.

SUMMARY OF THE INVENTION

The invention facilitates operation of a roll mill without manual manipulation of the material and reduces or obviates manual cutting of the banded material on the roll to allow new material onto the mill. We have found that, to accomplish this, it is necessary to have voids in the band at an input region of the roll mill, in contrast to typical compounding operations in which material fed into the roll mill forms a uniform band immediately. Material can be fed into the mill at one end and travel along the mill to a discharge end without being forwarded by an operator. This material is processed from a chunky, discontinuous state at an input region of the roll mill to a smooth, continuous strip drawn from an output end of the roll mill. This process may be operated at surface velocities typical for roll mill operation or at much higher surface velocities.

In one implementation, a continuous method of processing elastomer composite through a two-roll mill, the two-roll mill having an input region and an output region axially spaced from one another along a first of the two rolls, comprises admitting discrete pieces of elastomer composite to the two-roll mill at the input region; adjusting one or more of a nip gap width, friction ratio, surface velocity, and coolant temperature of the roll mill such that A) a band of elastomer composite on the roll mill has a plurality of voids through which the surface of the first roll is exposed, and B) elastomer composite precesses downstream from the input region to the output region as a result of the action of the mill; and simultaneously with admitting, discharging elastomer composite masticated by the two-roll mill from a predetermined axial position on the first mill as a coherent output strip; wherein, during discharging, any elastomer composite removed from the two-roll mill is removed continuously.

In an alternative implementation, a continuous method of processing elastomer composite through a two-roll mill, the two-roll mill having an input region and an output region axially spaced from one another along a first of the two rolls, comprises admitting discrete pieces of elastomer composite to the two-roll mill at the input region; adjusting one or more of a nip gap width, friction ratio, surface velocity, and coolant temperature of the roll mill such that A) a band of elastomer composite on the roll mill has a plurality of voids through which the surface of the first roll is exposed, and B) elastomer composite precesses downstream from the input region to the output region as a result of the action of the mill; and discharging elastomer composite masticated by the two-roll mill from a predetermined axial position on the first mill as a coherent output strip; wherein at least 90% of the elastomer composite removed from the two roll mill is removed continuously as a coherent strip.

In either of these implementations, the roll mill may further comprise a bank guard disposed above the two rolls, and the method further comprises selecting a configuration for a bank guard of the two-roll mill to selectively admit a portion of elastomer composite banked above the nip gap to the output region of the roll mill during admitting and discharging. The predetermined axial position may define a plane bisecting the output strip with respect to the axis of the first roll, and wherein the bank guard is disposed a predetermined distance closer to the input region than the predetermined axial position, and wherein the predetermined distance is from about 33% to about 90% of the diameter of the first roll. The bank guard may comprise a protruding portion extended towards the nip gap and having a lower edge disposed above the nip gap.

In any of these implementations, the two-roll mill may have a nip having a vertical dimension v defined by the distance from a center plane of the two-roll mill to a tangent plane of the two-roll mill, the nip further having a first horizontal dimension h defined by the distance between the rolls on the center plane and a second horizontal dimension defined by the distance between the first and second rolls on the tangent plane, and the bank guard may include first and second concave edges defining a protruding portion therebetween, the protruding portion having an edge, wherein the first and second concave edges are configured such that the first concave edge is disposed from about 3 h to about 5 h from a portion of the surface of the first roll disposed within the nip and the second concave edge is disposed a distance of about 3 to about 15 mm from a portion of the surface of the second roll disposed within the nip, and wherein the protruding portion extends into the nip towards the center plane to allow advancement of at least a portion of the elastomer composite disposed between the center plane and the edge of the protruding portion past the bank guard. The protruding portion may further include a cutaway edge adjacent to the first concave edge, wherein a limit between the cutaway edge and the first concave edge defines an angle with the center plane about an axis of the first roll and wherein the angle is from about 60 to about 90 degrees.

In any of these implementations, admitting and discharging may be performed simultaneously. During discharging any cut to the band has a tangential component that is at least twice as long as an axial component.

Any of the above implementations may further include making two parallel cuts in the band in the output region in a direction perpendicular to an axis of the first roll, thereby defining two spaced channels in the band; actuating a starter blade against a surface of the first roll between the spaced channels, thereby making an axial cut in the band of resilient material and starting the output strip; directing the output strip to a conveyor disposed at a predetermined distance from the starter blade; and continuously conveying elastomer composite away from the band via the output strip. Making two parallel cuts may include actuating two knives against the surface of the first roll.

In any of the above implementations, the method may further include directing a strip of elastomer composite from the band to the output region. The strip of elastomer composite may be directed from a portion of the band disposed either upstream or downstream of the output region.

In any of the above implementations, admitting may be performed at a rate of from about 200 kg/hr to about 2000 kg/hr; admitting and discharging may be performed for at least 30 minutes without stopping; a surface velocity of at least one of the rolls may be at least 40 m/min, for example, from about 45 m/min to about 70 m/min; and/or from about 300 kJ/kg to about 900 kJ/kg of energy may be imparted to the elastomer composite on the two-roll mill.

In another implementation, a method of preparing elastomer composite through a two-roll mill comprises combining a first fluid comprising elastomer latex with a second fluid comprising particulate filler; causing the elastomer latex to coagulate, thereby forming masterbatch crumb; bringing a water content of the masterbatch crumb to about 0.5% to about 3% moisture by weight, thereby producing a dried elastomer composite; admitting discrete pieces of the dried elastomer composite to a two-roll mill, the two-roll mill having an input region and an output region axially spaced from one another along a first of the two rolls, at the input region; adjusting one or more of a nip gap width, friction ratio, surface velocity, and coolant temperature of the roll mill such that A) a band of the dried elastomer composite on the roll mill has a plurality of voids through which the surface of the first roll is exposed, and B) the dried elastomer composite precesses downstream from the input region to the output region as a result of the action of the mill; and simultaneously with admitting, discharging elastomer composite masticated by the two-roll mill from a predetermined axial position on the two-roll mill as a coherent output strip; wherein, during discharging, any elastomer composite removed from the two-roll mill is removed continuously.

In another implementation, a method of preparing elastomer composite through a two-roll mill, the method comprises combining a first fluid comprising elastomer latex with a second fluid comprising particulate filler; causing the elastomer latex to coagulate, thereby forming masterbatch crumb; bringing a water content of the masterbatch crumb to about 0.5% to about 3% moisture by weight, thereby producing a dried elastomer composite; admitting discrete pieces of the dried elastomer composite to a two-roll mill, the two-roll mill having an input region and an output region axially spaced from one another along a first of the two rolls, at the input region; adjusting one or more of a nip gap width, friction ratio, surface velocity, and coolant temperature of the roll mill such that A) a band of the dried elastomer composite on the roll mill has a plurality of voids through which the surface of the first roll is exposed, and B) the dried elastomer composite precesses downstream from the input region to the output region as a result of the action of the mill; and discharging elastomer composite masticated by the two-roll mill from a predetermined axial position on the two-roll mill as a coherent output strip; wherein at least 90% of the elastomer composite removed from the two roll mill is removed continuously as a coherent strip.

In either of these two implementations, combining and causing may comprise A) feeding a continuous flow of first fluid comprising elastomer latex to a mixing zone of a coagulum reactor; B) feeding a continuous flow of second fluid comprising particulate filler under pressure to the mixing zone of the coagulum reactor to form a mixture with the elastomer latex, the particulate filler being effective to coagulate the elastomer latex and the feeding of the first fluid and the second fluid within the mixing zone being sufficiently energetic to substantially completely coagulate the elastomer latex with the particulate filler in the coagulum reactor; to form the masterbatch crumb; and C) discharging a substantially continuous flow of masterbatch crumb from the coagulum reactor.

In any of these implementations that include bringing, bringing may include bringing the masterbatch crumb to a water content of about 1 weight percent to about 20 weight percent, thereby forming a dewatered coagulum; feeding the dewatered coagulum to a feed port of a continuous compounder; processing the dewatered coagulum through a processing chamber of the continuous compounder by controlled operation of the rotor; and discharging the resulting dried elastomer composite from a discharge orifice of the continuous compounder.

In any of the above implementations, the method may further include selecting a configuration for a bank guard of the two-roll mill to selectively admit a portion of elastomer composite banked above the nip gap to the output region.

The predetermined axial position may define a plane bisecting the output strip with respect to the axis of the first roll, wherein the bank guard is disposed a predetermined distance closer to the input region than the predetermined axial position, and wherein the predetermined distance is from about 33% to about 90% of the diameter of the first roll.

In any of these implementations, admitting and discharging may be performed simultaneously and/or during discharging, any cut to the band has a tangential component that is at least twice as long as an axial component.

In any of these implementations, the method may further include directing a strip of elastomer composite from the band to the output region. The strip of elastomer composite may be directed from a portion of the band disposed upstream or downstream of the output region.

In any of the above implementations, admitting may be performed at a rate of from about 200 kg/hr to about 2000 kg/hr; admitting and discharging may be performed for at least 30 minutes without stopping; a surface velocity of at least one of the rolls may be at least 40 m/min; a surface velocity of at least one of the rolls may be from about 45 m/min to about 70 m/min; and/or from about 300 kJ/kg to about 900 kJ/kg of energy may be imparted to the elastomer composite on the two-roll mill.

In another implementation, in a two-roll mill for processing viscoelastic material, the two-roll mill comprising first and second parallel rolls having a nip therebetween, the nip having a vertical dimension v defined by the distance from a center plane of the two-roll mill to a tangent plane of the two-roll mill, the nip further having a first horizontal dimension h defined by the distance between the rolls on the center plane and a second horizontal dimension defined by the distance the first and second rolls on the tangent plane, the two-roll mill further includes a bank guard having first and second concave edges defining a protruding portion therebetween, the protruding portion having an edge, wherein the first and second concave portions are configured such that the first concave edge is disposed from about 3 h to about 5 h from a portion of the surface of the first roll disposed within the nip and the second concave edge is disposed a distance of about 3 to about 15 mm from a portion of the surface of the second roll disposed within the nip, and wherein the protruding portion extends into the nip towards the center plane to allow, during operation of the roll mill, advancement of viscoelastic material disposed between the center plane and the edge of the protruding portion past the bank guard.

The two-roll mill may further include two knives disposed proximate to the first roll and configured to, during operation of the two-roll mill, cut an output strip of viscoelastic material disposed on the first roll, wherein the bank guard is spaced axially a predetermined distance from a circumference of the two-roll mill disposed midway between the two knives, and wherein the predetermined distance is from about 33% to about 90% of the diameter of the first roll. Alternatively or in addition, the protruding portion may further include a cutaway edge adjacent to the first concave edge, wherein a limit between the cutaway edge and the first concave edge defines an angle with the center plane about an axis of the second roll and wherein the angle is from about 60 to about 90 degrees.

In another implementation, an apparatus for starting a strip of resilient material for removal from a band of the resilient material disposed on a first of two rolls of a two-roll mill or a calendaring mill comprises a starter blade; an actuator that advances and retracts the starter blade; and a conveyor for receiving the strip of elastomer material and conducting the resilient material away from the first roll.

The apparatus may further include first and second knives that are disposed in a direction orthogonal to the direction of the starter blade and that are spaced to define the width of the strip and a knife actuator that advances and retracts the first and second knives independently of the starter blade.

In any implementation of the apparatus for starting, a distance and/or an angle between the starter blade and the conveyor may be adjustable; an orientation of the starter blade with respect to the surface of the first roll is adjustable; and/or the apparatus may further include a strip exit guide disposed at an output end of the conveyor, the conveyor receiving the strip at an input region.

In another implementation, a method of starting a strip of resilient material for removal from a band of the resilient material on a first of two rolls of a two-roll mill or a calendaring mill comprises making two parallel cuts in the band, thereby defining two spaced channels in the band; actuating a starter blade against a surface of the first roll between the two spaced channels, thereby making an axial cut in the band of resilient material and starting a strip; directing the strip of resilient material to a conveyor disposed at a predetermined distance from the starter blade; and continuously conveying resilient material away from the band via the strip.

Making two parallel cuts may include actuating two knives against the surface of the first roll, the knives being mechanically connected to the starter blade. Alternatively or in addition, the method may further include, during continuously conveying, actuating the starter blade a predetermined distance from the surface of the first roll. The predetermined distance may be greater than a thickness of the strip.

In any of the above implementations of the method for starting a strip, the method may further include adjusting an angle of the starter blade with respect to the conveyor, a distance of the starter blade from the conveyor, and/or adjusting an angle of the starter blade with respect to the surface of the first roll.

It is to be understood that both the foregoing general description and the following detailed description are exemplary and explanatory only and are intended to provide further explanation of the present invention, as claimed.

BRIEF DESCRIPTION OF THE DRAWING

The invention is described with reference to the several figures of the drawing, in which.

DETAILED DESCRIPTION OF THE INVENTION

Figure 1:
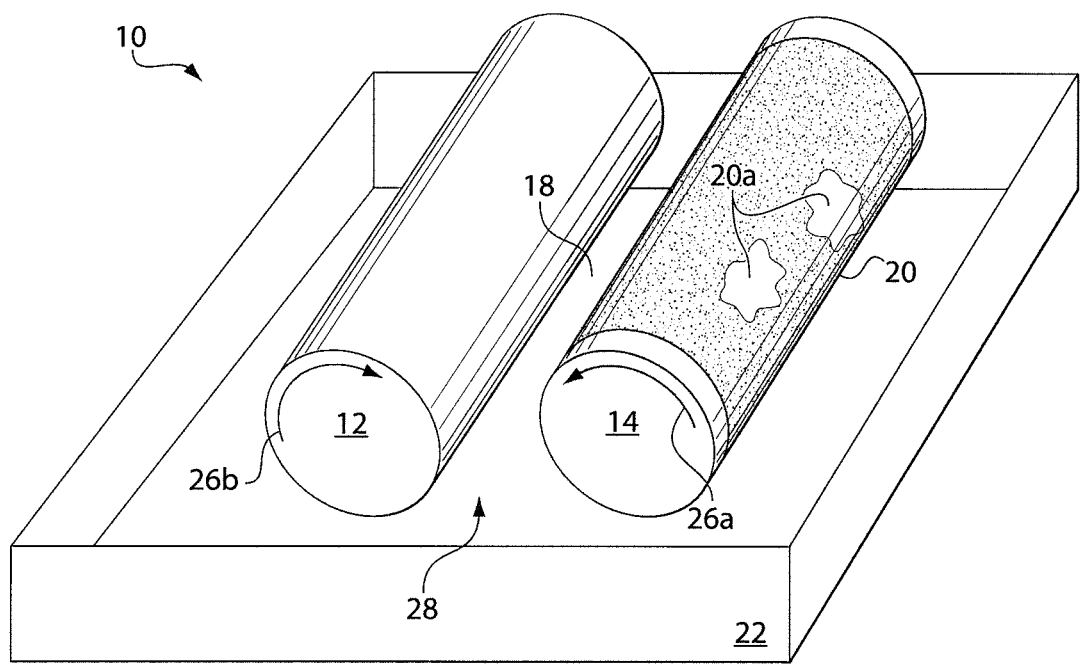
FIG. 1 is a schematic diagram of a two roll mill.

An exemplary roll mill apparatus 10 for use with the invention in shown in FIG. 1. The roll mill 10 has two rolls, a "rear" roll 12 and a "front" roll 14. The choice of which roll is the front or the back roll depends on the installation configuration of the apparatus 10. In most implementations, the two rolls will have the same diameter; however, this is not required. The space between the rear roll 12 and the front roll 14 is termed the nip 18. Material is deposited to the roll mill 10 at nip 18 and forms a band 20, preferably on the front roll 14.

Figure 5:
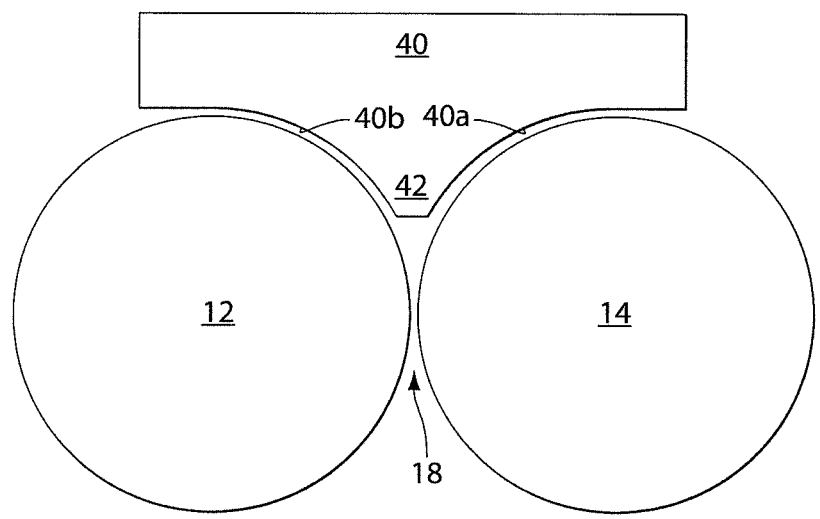
FIG. 5 is an end view of the two roll mill depicted in FIG. 1, including a schematic diagram of a bank guard according to certain embodiments.
Figure 5A:
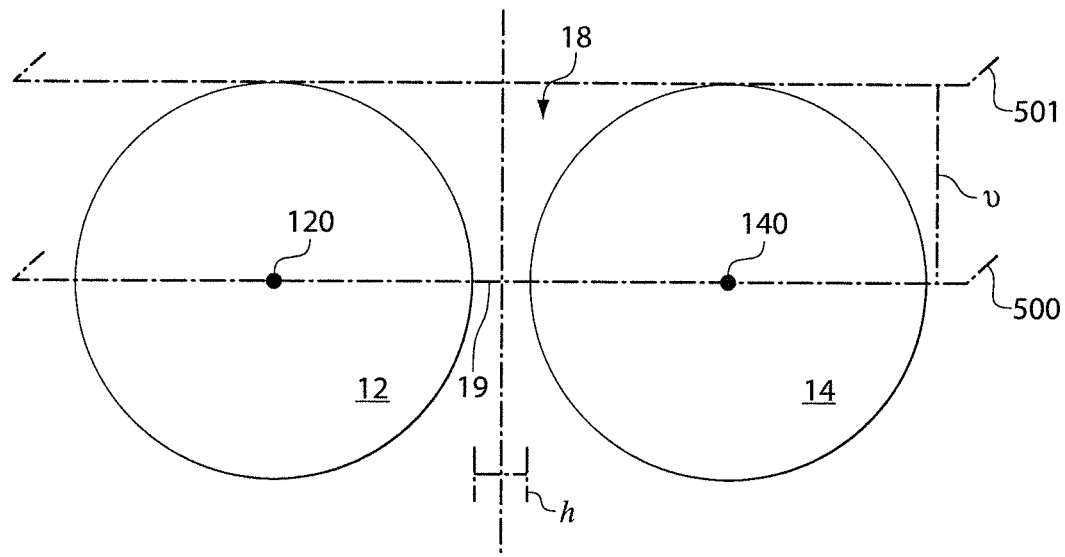
FIG. 5A is a schematic diagram of the two roll mill in FIG. 1.

In one configuration, shown in FIG. 5A, the two rolls 12 and 14 are parallel and are the same size. Front roll has a center axis 140 and back roll has a center axis 120. The two center axes 140 and 120 define center plane 500.

Figure 2:
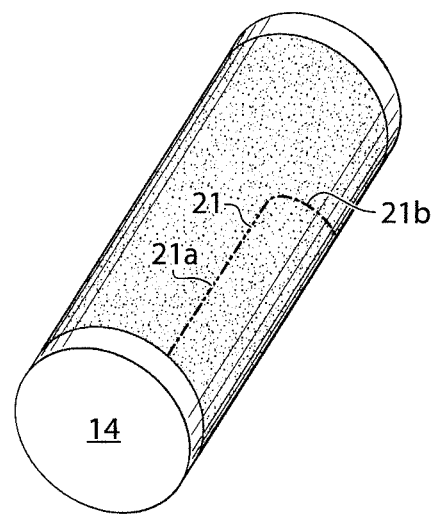
FIG. 2 is a schematic diagram of one roll of the two roll mill in FIG. 1.

In prior art methods, an operator may cut the band 20, for example, along line 21 (FIG. 2). Line 21 has two components: an axial component 21a that is created by a cutting motion roughly parallel to, i.e., within 20 degrees of the direction of center plane 500. The second component is a tangential component 21b that is created by a stationary blade or a cutting motion roughly perpendicular to, i.e., from 70 to 110 degrees of the direction of center plane 500. Of course, the front roll 14 continues to turn as the operator cuts line 21. Therefore, as the operator draws the cutting tool in the axial direction to cut axial component 21a, the resulting cut actually defines a larger angle with respect to center plane 500. The length of the tangential component 21b determines the size of the strip which is cut from the band 20. The cut strip falls towards tray 22, from which it is picked up either by the turning action of the front roll 14 or with assistance from the operator. In typical prior art methods, axial component 21a is significantly longer than tangential component 21b, as shown in FIG. 2.

Figure 3:
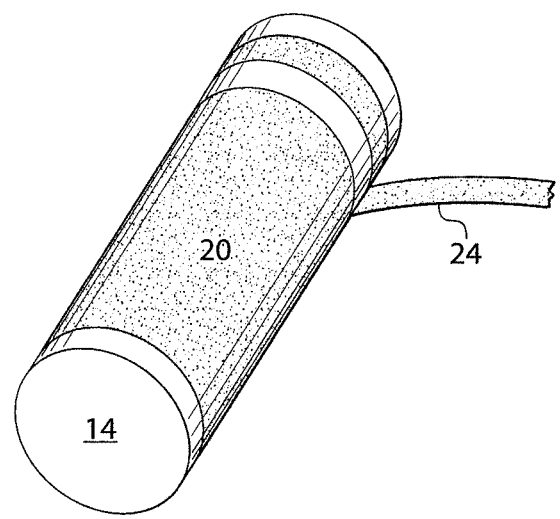
FIG. 3 is a schematic diagram of one roll of the two roll mill in FIG. 1.

The rubber is removed the roll mill 10 by cutting an output strip 24 (FIG. 3). The output strip 24 may be drawn away from the mill 10 by a conveyor (not shown).

Figure 4:
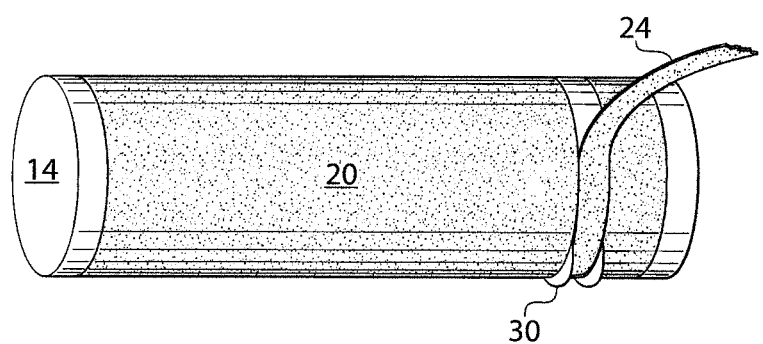
FIG. 4 is a schematic diagram of the roll depicted in FIG. 3 viewed from the side.

In prior art methods, if the output strip 24 breaks, a new strip must be started by the operator. The operator makes a cut near the end of the band 20 roughly parallel to the center plane 500. Mill cutting knives 30 (FIG. 4) underneath the front roll 14 define output strip 24. The operator pulls the leading portion of the output strip 24 away from the front roll 14.

In contrast, a method is provided herein in which, once the roll mill 10 is started up, manual intervention is not required to maintain steady state operation in which unprocessed material is delivered to an input region 28 of the roll mill 10 in a continuous fashion, and processed material is removed continuously via output strip 24.

It is desired to operate the roll mill 10 in an automated continuous fashion while it performs two functions. First, the input to the roll mill 10 typically comprises discontinuous chunks of material. These chunks are consolidated, worked, and flattened by the action of the roll mill 10 in order to produce a continuous, flat blanket of uniform thickness (i.e., band 20) surrounding the front roll 14 for removal via output strip 24. Second, the action of the roll mill 10 masticates the material, typically elastomer composite, increasing the plasticity of the material, thereby rendering it more deformable without tearing, and mixing the composite to form a uniform mass of material. In some embodiments, a specified amount of work needs to be imparted to the elastomer composite to achieve desired mechanical properties.

Optionally, the roll mill 10 may perform a third function. In one embodiment, the output strip 24 has the correct dimensions (thickness and width) to form the finished product, such as a stacked sheet bale, a bale of sheets cut from the output of a sheeting mill. Alternatively, the output strip 24 may be fed to a sheeting mill which compresses and widens the output strip 24 into more desirable dimensions.

In order to operate the roll mill in an automated continuous fashion, unprocessed material must be continuously and successfully taken up on the front roll 14 without manual intervention, i.e., cutting and folding band 20. The material must be masticated to a desired degree while migrating along front roll 14. Finally, the output strip 24 must continuously draw material away from the front roll 14 without breaking. These operational requirements are met by controlling operational variables of the roll mill 10. The ingestion of material by the roll mill 10, the formation of the band 20 on front roll 14, the amount of energy imparted to the material by the roll mill 10, and the rate of axial movement from input region 28 towards outlet strip 24 are influenced in part by the temperature of the rolls 12 and 14, the surface velocity of the front and rear rolls 14 and 12, the friction ratio (the ratio of the surface velocities of the front and rear rolls 14 and 12, and the size of the nip gap 19, that is, the width of the nip at its narrowest point.

The temperature of the rear roll 12 and front roll 14 may be controlled by circulating water through one or both rolls. The two rolls may be maintained at the same or different temperatures. The circulating water may be directed through a central core or through peripherally drilled channels closer to the surface of the front roll 14 and rear roll 12. Use of rolls having peripherally drilled channels allows for faster heat transfer away from the surface of the roll, as heat does not have to diffuse as far to the cooling channels. As will be understood by those of skill in the art, the capacity of the cooling fluid to remove heat from the surface of the roll will also depend on the recirculation rate of the fluid.

The temperature of the roll is adjusted to control the adhesion of the band 20 to the front roll 14. There is an optimal temperature range at which material will form a continuous band that adheres to the surface of front roll 14. For natural rubber and natural rubber composites, the optimal temperature range for the rubber is from about 120 to about 140° C. In certain implementations, the cooling fluid may have a temperature from about 50° C. to about 65° C., for example, from about 50° C. to about 55° C., from about 55° C. to about 60° C., or from about 60° C. to about 65° C. Poor banding may lead to formation of voids in band 20 or may cause band 20 to sag or pull away from the surface of the roll. The optimal temperature will vary depending on the composition of the material being processed, e.g., the composition of the polymer and the composition and loading level of any filler. It is desirable that the material at the input region 28 exhibit voids 20a in the band 20. These voids provide fresh surface which facilitate ingestion of incoming material by the roll mill 10. As the material is processed and proceeds axially along the front roll 14, the band 20 becomes smoother.

The operation of the roll mill 10 is optimized to maintain a poor quality band at the input region 28 but allow formation of a continuous, void-free band closer to the output strip 24. If the band does not develop voids at the input region 28, the temperature may be adjusted up or down away from the optimal temperature to reduce the quality of the band and generate voids. It is preferable to reduce the temperature of the front roll 14 and/or rear roll 12. For certain polymers, there may be a maximum temperature above which the properties of the material may degrade. However, the temperature of the front roll 14 and/or rear roll 12 may be adjusted up to this point. Alternatively or in addition, the nip 18 may be adjusted to promote ingestion at input region 28.

The surface velocity of the rear roll 12 and front roll 14 may be adjusted according to criteria understood by those of skill in the art. The two rolls rotate in opposite directions to draw material in through the nip 18, as demonstrated by the arrows 26a and 26b in FIG. 1. The surface velocity may be calculated from the rate of rotation of the rolls and the diameter of the rolls 12 and 14. The rear roll 12 and front roll 14 need not have the same velocity, as discussed below. The optimal rate of rotation is determined by the desired throughput and the amount of energy that is to be imparted to the material on the mill.

In addition, the roll mill 10 may have a maximum speed above which it may be impractical to operate the apparatus in compliance with relevant governmental regulations while manually cutting and folding material into the nip. In the United States, the Occupational Health and Safety Administration prescribes that a manually operated roll mill must be stopped, e.g., in an emergency, within a distance in inches not greater than 1.5% of the surface speed in feet/min (29 CFR 1910.216(f)(2), 2012). For example, at 35 m/s, the mill must stop within about 21 inches, or within about 0.015 seconds.

For a variety of reasons, e.g., to accelerate ingestion of material by the front roll 14, or to increase throughput or mastication energy, it may be desirable to operate a roll mill at a higher surface velocity, e.g., about 45 m/s to about 70 m/s, for example, about 47 m/s to about 62 m/s, or about 52 m/s to about 60 m/s. Also, during automated operation, it may be desirable to operate with a higher surface velocity. In certain embodiments, the roll mill imparts from about 300 kJ/kg to about 1500 kJ/kg of energy to the material. For example, the roll mill may impart from about 300 kJ/kg to about 400 kJ/kg, from about 400 kJ/kg to about 500 kJ/kg, from about 500 kJ/kg to about 600 kJ/kg, from about 600 kJ/kg to about 700 kJ/kg, from about 700 kJ/kg to about 800 kJ/kg, from about 800 kJ/kg to about 900 kJ/kg, from about 900 kJ/kg to about 1000 kJ/kg, from about 1000 kJ/kg to about 1100 kJ/kg, from about 1100 kJ/kg to about 1200 kJ/kg, from about 1200 kJ/kg to about 1300 kJ/kg, from about 1300 kJ/kg to about 1400 kJ/kg, or from about 1400 kJ/kg to about 1500 kJ/kg of energy to the material. The Mooney viscosity of carbon black-filled natural rubber composites decreases with increased mastication energy. We have additionally found that the bound rubber content of the same composites is maximized at a lower value of mastication energy (e.g., 300-900 kJ/kg) and that mechanical properties such as rebound are also optimized at lower amounts of imparted energy (e.g., 300-900 kJ/kg).

The friction ratio of the roll mill 10, i.e., the ratio of the surface velocities of the front roll 14 and rear roll 12, may also be varied to adjust the advancement of material from the input region 28 towards the outlet strip 24. Typically, the friction ratio is maintained at from about even (1:1) to about 1:1.2 (front:back), for example, from about 1:05 to about 1.1, from about 1:1 to about 1:1.15, or from about 1:1.15 to about 1:2 (see, e.g., John S. Dick, ed., *Rubber Technology: Compounding and Testing for Performance*, 2001, Hanser Verlag, p. 505).

The width of nip gap 19 is typically varied between about 0.25 and about 2 cm (see, e.g., Andrew Ciesielski, *An Introduction to Rubber Technology*, 1999, Rapra Technology Limited, p. 50), for example, from about 0.35 to about 0.5 cm, from about 0.5 to about 0.75 cm, from about 0.75 to about 1 cm, from about 1 cm to about 1.25 cm, from about 1.25 cm to about 1.5 cm, from about 1.5 cm to about 1.75 cm, or from about 1.75 cm to about 2 cm. The width of the nip gap 19 determines how much material can be loaded onto the roll mill 10. Therefore, for a given surface velocity, a larger nip gap 19 permits a higher ingestion rate and facilitates more rapid transport of material axially along the roll mill 10. However, if the nip gap 19 is too wide, any cutting of band 20 required during startup will be more difficult, since the band will be thicker. Moreover, material may fall through the nip gap 19 rather than being incorporated into band 20. In extreme cases, the band 20 may not adhere to the front roll 14 and will exhibit bagging instead, with portions of band 20 drooping away from the front roll. In addition, the size of the nip gap determines the amount of shear and mastication energy imparted to the material. In general, less energy is imparted to the material as the nip gap increases. For a given surface velocity, the optimal nip gap for a given material will depend on the composition of the polymer and the composition and loading level of any filler.

The width of output strip 24 is dictated by the material balance on the roll mill 10. In general, material should be removed via output strip 24 at the same rate as material is deposited on the bill at the input region 28. An approximate width of output strip 24 can be calculated based on the nip gap 19 and the surface velocity of the front roll 14. The width of nip gap 19 does not precisely determine the thickness (i.e., the depth with respect to front roll 14) of the output strip 24; rather, the thickness of the output strip 35 can be estimated by multiplying the width of nip gap 19 by a factor of about 2-3 to account for swelling of the material after emerging from the nip gap 19. If, during operation, it becomes apparent that the output strip 24 is too wide or too narrow, the surface velocity of the front roll 14 and back roll 12 may be adjusted to compensate. Alternatively or in addition, some roll mills 10 are configured to allow automated adjustment of the output strip 24 width during operation. If the width cannot be adjusted automatically and adjustment of surface velocity is not successful in restoring material balance, it may be necessary to stop operation, reset the width of the output strip 24, and restart roll mill 10.

The material that is delivered to the input region 28 of the roll mill 10 may be delivered from a variety of apparatus, for example, from an internal mixer or from a continuous compounder. Thus, the methods and apparatus provided herein may be applied to the techniques provided in, e.g., PCT Publications Nos. WO00/062990 or WO2009/099623 by Cabot Corporation. The configuration provided herein is ideal for continuous delivery of in-process material to the roll mill 10. The material will typically be delivered in discontinuous chunks having a length on the order of 200-2000 mm. To facilitate ingestion of the material by the roll mill, larger pieces of material may be cut into smaller bits, e.g., from about 10 cm long to about 15 cm long, to provide a more consistent input flow to the roll mill 10.

In high speed operation, the width of the output strip 24 will be relatively small. Because of the reduced cross-sectional area of the narrow strip, it can rip easily if it is pulled too hard. The apparatus employed to carry the output strip 24 away from the roll mill 10 must be carefully matched to the velocity of the strip to reduce tension on the output strip 2. In addition, the mill knives 30 should be adjusted carefully to contact the surface of front roll 14 and cut all the way through band 20. If the output strip 24 is not completely cut from the band 20, it will experience tension as it is drawn away from the band 20. Furthermore, the mill knives 30 should be configured such that the output strip 24 does not "restick" to band 20 after it is cut but before it is removed from the front roll 14. In practice, the mill knives 30 may be positioned close to the point where the output strip 24 is removed. Alternatively or in addition, they may employ wide blades to create a gap between the output strip and the remainder of the band 20.

As discussed above, material is deposited to the roll mill at an input region 28 at the other end of the rolls 12 and 14 from output strip 24. We have found that the use of a properly configured bank guard 40 (FIG. 5) extends the amount of time between breaks in the output strip 24. Without being bound by any particular theory, it is hypothesized that the material in the band 20 should be properly masticated before it is drawn off the roll mill 10 via the output strip 24 and that incorporation of under-processed material in the output strip causes voids that lead to breakage. However, the progress of material within the band 20 along the front roll 14 is not entirely uniform. Thus, if properly configured with respect to the rolls 12 and 14 and the nip 18, the bank guard can prevent under-processed material from proceeding to the output strip 24. Alternatively, it is also hypothesized that if material is forwarded under the bank guard 40 at a rate that exceeds the feed/harvest rate, a bank builds up in the vicinity of the take-off point of output strip 24. When this material is finally incorporated into the output strip, it can cause voids in the output strip 24, resulting in breakage.

Preferably, the bank guard 40 is configured to allow material on the band 20 to migrate past the bank guard 40 to satisfy the material balance. Furthermore, the front edge 40*a* of bank guard 40 should be far enough from the band 20 to avoid scraping the surface of the band. However, the back edge 40*b* of the bank guard 40 may be closer to the surface of back roll 12, which typically does not carry material. The optimal configuration will depend in part on the diameter of the rolls 12 and 14 and the size of the nip gap 19. A protrusion 42 of the bank guard 40 should extend far enough into the nip 18 to prevent material that has not been processed through nip 18 from proceeding to the output strip 24. The optimal spacing between the bank guard and the rolls 12 and 14 and the amount of the nip 18 that is blocked by protrusion 42 will depend in part on the composition of the material being processed, including the polymer composition and the composition and loading of any filler.

Figure 5B:
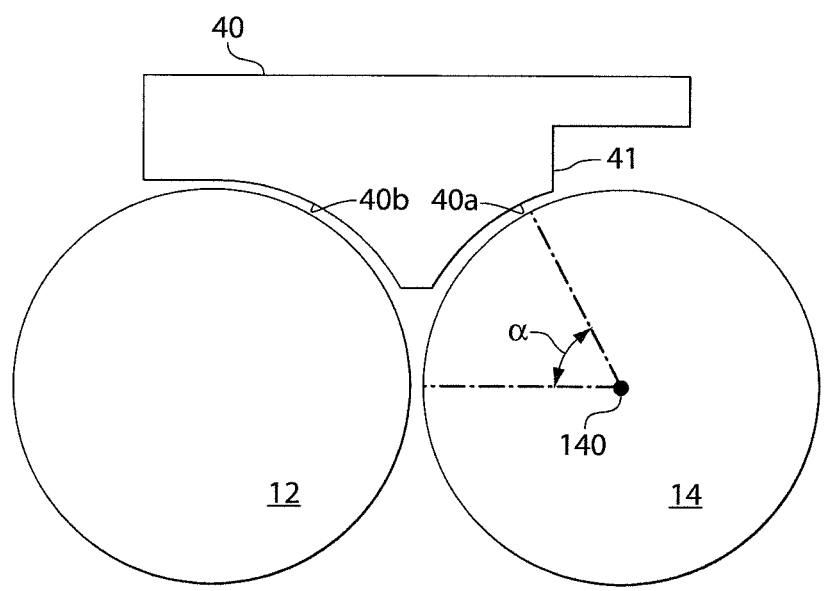
FIG. 5B is a schematic diagram of a alternative bank guard to that depicted in FIG. 5.

In one configuration, shown in FIG. 5A, the two rolls 12 and 14 are parallel and are the same size. Front roll has a center axis 140 and back roll has a center axis 120. The two center axes 140 and 120 define center plane 500. Tangent plane 501 is tangent to both front roll 14 and back roll 12. The width h of nip gap 19 is the distance between front roll 14 and back roll 12 on plane 500. The nip 18 is the area between front roll 14 and back roll 12 between planes 500 and 501. Material that is not ingested into band 20 but is disposed below plane 500 will likely drop into tray 22; thus, the area below plane 500 is not included in the nip 18. The height v of the nip 18 is the distance between the planes 500 and 501. Where the two rolls are not the same diameter and are not parallel, the distance v may be calculated by constructing a line tangent to both rolls in place of tangent plane 501. In one embodiment, edge 40*b* is from about 3 to about 15 mm from the surface of back roll 12, while edge 40*a* is from about 3 h to about 5 h from the surface of front roll 14. These distances need to be maintained only for the portion of the bank guard 40 disposed within nip 18. The portion of edges 40*a* and 40*b* outside the nip may be farther away from the surface of their respective rolls 12 and 14. Indeed, outside of the nip 18, the edge of the bank guard 40 need not be curved but may angle away from the surface of the roll mill 10. In an alternative embodiment, the distance of edge 40*a* from the surface of front roll 14 is maintained within a certain angular distance within the nip 18. For example, the limit of edge 40*a* may define an angle $\alpha$ about center axis 140 with respect to the center plane 500 (FIG. 5B). The angle $\alpha$ may be from 60 to about 90 degrees. Outside of the angle $\alpha$, it may even be desirable to cut away a portion of the bank guard (e.g., cutaway 41). Angle $\alpha$ need only be large enough for the bank guard to prevent passage of material sitting in the nip 18 and not yet incorporated into band 20. Edge 40*b* may end in a similar cutaway.

The thickness of bank guard 40 is dictated primarily by the materials of construction. The bank guard 40 should be sufficiently thick so that it may be supported by brackets or other suitable supports (not shown) above the rolls 12 and 14 that the protrusion 42 is not deformed under the force of the material in nip 18.

The axial position of the bank guard 40 with respect to the rolls 12 and 14 may also be optimized. Specifically, if the bank guard is too close to the input region 28 of the mill 10, then there may not be enough axial length on the upstream side of the roll mill 10 to uptake and process material. Having a discrete distance between the bank guard and the output strip 24 provides "insurance" against a piece of unprocessed material being taken up into the band 20 downstream of the input region 28. In the event that unprocessed material travels axially along the mill before being incorporated into the band, it can still be processed somewhat in the portion of the roll mill 10 between the bank guard 40 and the output strip 24. We have achieved continuous operation, that is, uninterrupted removal of material from the two roll mill, without manual intervention for acceptable periods of time, e.g., at least about 30 minutes, for example, at least about 1 hour, at least about 90 minutes, or about two hours or more, when the bank guard 40 is sufficiently spaced from the output strip 24, e.g., about 300 to about 700 mm upstream from the point where output strip 24 is removed. In certain embodiments, the spacing between the bank guard 40 and the output strip 24, measured to the center of the output strip, is from about 33% to about 90% of the diameter of the front roll 14, for example, from about 33% to about 55%, from about 37% to about 62%, from about 40% to about 50%, from about 50% to about 60%, from about 60% to about 70%, from about 70% to about 77%, from about 75% to about 86%, or from about 80% to about 90% of the diameter of front roll 14. For a front roll having a diameter of 32 in., the spacing may be from about 300 mm to about 500 mm or from about 500 mm to about 700 mm. This spacing depends in part on the other operating parameters of the roll mill. For example, it may be desirable to increase the spacing between the bank guard 40 and the output strip 24 if the width of nip gap 19 is increased.

In preferred embodiments, the roll mill can be operated continuously, that is, material is removed from the mill without interruption, for up to about four hours or more, up to about 8 hours or more, up to about 12 hours or more, or up to about 16 hours or more, without manual intervention. Indeed, manual cutting and folding is not the same as removing material without interruption because manual cutting periodically removes a flap of material from the band in a discontinuous fashion.

Figure 6:
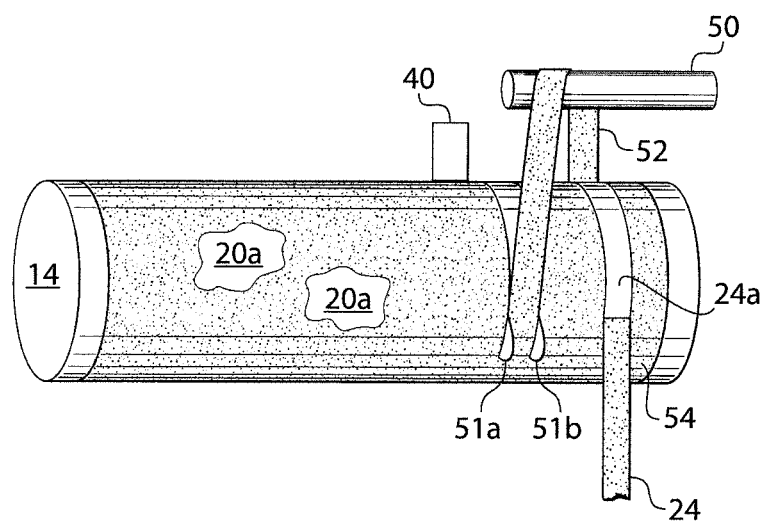
FIG. 6 is a side view of the two roll mill depicted in FIG. 1, including a bank guard and a blender bar.

An optional blender bar 50 (FIG. 6) can also facilitate continuous operation of roll mill 10. A strip of material downstream (i.e., towards the output strip 24) of the bank guard 40 is cut by secondary mill knives 51*a* and 51*b* and draped over the rotating blender bar 50 to form blender strip 52. The blender strip 52 may be manually fed over the blender bar 50 during startup. The blender strip 52 is fed back into the nip 18 in the region of the output strip 24. Transfer of the blender strip 52 vacates a portion of the front roll 14, making room for any rubber banked above nip 18 (rather than in band 20) to be drawn into nip 18 and band onto the vacant portion of the front roll 14. Thus, any bank that builds up above the strip harvest area 24a would be encouraged to be processed through the nip 18 more frequently than if there were no blender bar. The rate of exchange between banked rubber and the band 20 is accelerated, reducing the accumulation of bank material that can disrupt output strip 24. The blender strip 52 may be taken from anywhere downstream of the bank guard 40, including the collar 54 downstream of strip harvest area 24a. Taking the blender strip 52 from downstream of strip harvest area 24a facilitates exchange of the material in collar 54 to the output strip 24.

Removal of the blender strip 52 is preferably continuous; that is, the blender strip 52 leaves front roll 14, travels over blender bar 50, and returns to nip 18 without interruption of the blender strip. In some embodiments, material is removed from the front roll 14 via the blender strip without interruption for at least about 30 minutes, for at least about 1 hour, at least about 90 minutes, or at least about two hours or more. In preferred embodiments, material is removed from the front roll 14 via the blender strip for up to about four hours or more, up to about 8 hours or more, up to about 12 hours or more, or up to about 16 hours or more.

During steady state operation, that is, after startup and during simultaneous admission of material to and removal of material from roll mill 10, preferably any, for example, all, material removed from the roll mill 10 is removed in a continuous, uninterrupted fashion. In particular embodiments, at least about 75 wt %, at least about 80 wt %, at least about 85 wt %, at least about 90 wt %, at least about 95 wt %, or at least about 98 wt % of the material removed from roll mill 10 is removed continuously, without interruption.

It is also desired to start the output strip 24 without intervention by the operator. If the output strip 24 breaks during high speed operation, the roll mill 10 must be slowed down if the operator is going to approach the roll mill 10 to restart the output strip 24. Moreover, a broken output strip 24 disrupts the mass balance on the roll mill 10. Slowing the roll mill 10 to allow the operator to approach the mill 10 safely further interrupts the steady state operation of the mill 10 and increases the time to bring the mill 10 back to its normal operating conditions, further disrupting the material balance on the roll mill 10. However, the invention provides an apparatus for starting the output strip 24 that may be controlled remotely. Because the operator does not need to approach the roll mill 10, the new output strip may be started without slowing down the roll mill 10, reducing the disruption to the material balance on the roll mill 10.

Figure 7:
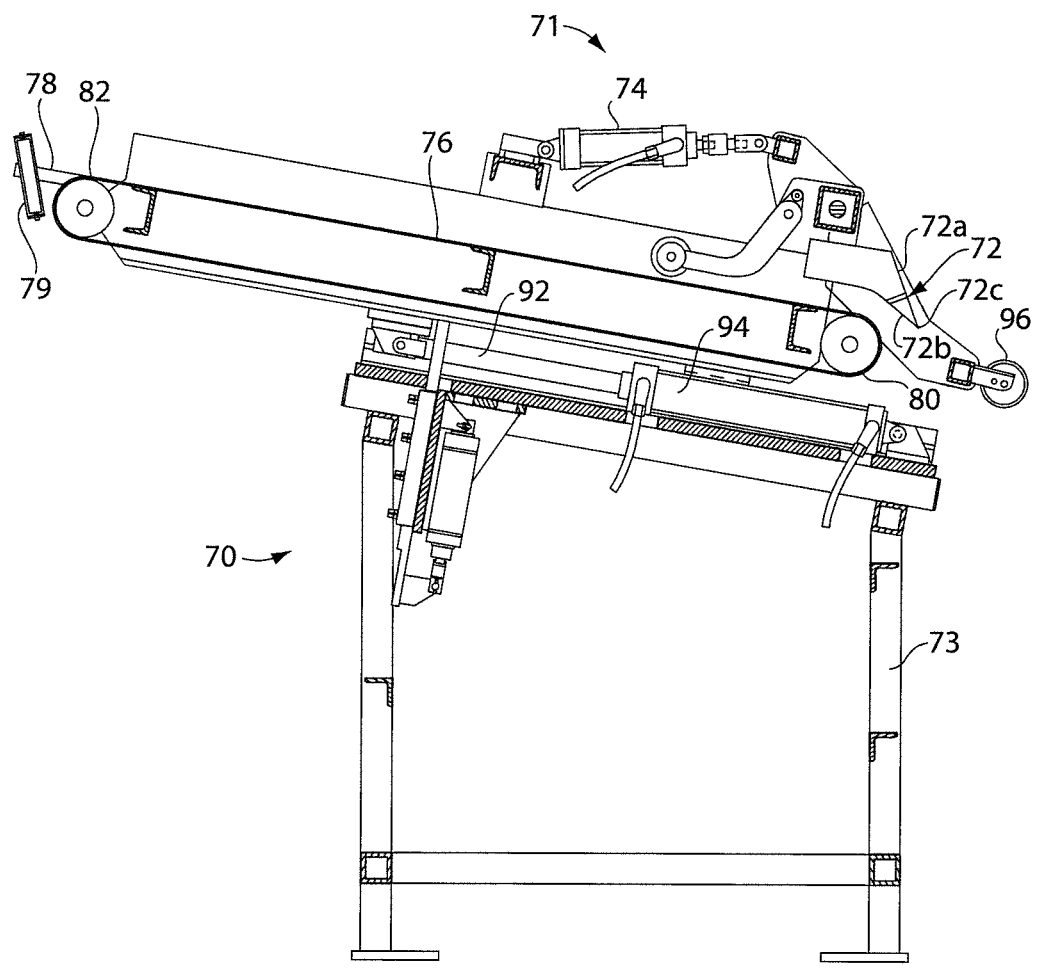
FIGS. 7 and 8 are schematic views of a strip cutting apparatus for use with a two roll mill.

An automatic strip cutter 70 is depicted in FIG. 7. The automatic strip cutter 70 includes a strip cutting and removal assembly 71 mounted on a support stand 73. The front of the strip cutting and removal assembly 71 includes a starter blade 72 that contacts front roll 14 and cut through the band 20 when actuated forward. The starter blade 72 contacts the front roll 14 from about 0 to about 30 degrees below the centerline of the roll, for example, from about 0 to about 10 degrees, from about 10 to about 20 degrees, or from about 20 to about 30 degrees. The angle between the upper edge 72a of the starter blade 72 and the front roll 14 may be from about 10 to about 45 degrees steeper (i.e., tilted away from the front roll 14) than the tangent to front roll 14. The angle between the upper edge 72a and lower edge 72b of the blade 72 may be from about 10 to about 45 degrees.

Cylinder 94 actuates starter blade 72 against the front roll 14. The force with which starter blade 72 contacts front roll 14 may be from about 40 to about 450 lbs force, for example, from about 40 to about 100 lbs, from about 100 lbs to about 150 lbs, from about 150 lbs to about 200 lbs, from about 200 lbs to about 250 lbs, from about 250 lbs to about 300 lbs, from about 300 lbs to about 350 lbs, from about 350 lbs to about 400 lbs, or from about 400 lbs to about 450 lbs. Once cut, the output strip 24 is directed along a conveyor belt 76 to conveyor exit 78, including roller 79. Roller 79 directs the output strip 24 around an angle towards the next piece of processing equipment.

Figure 8:
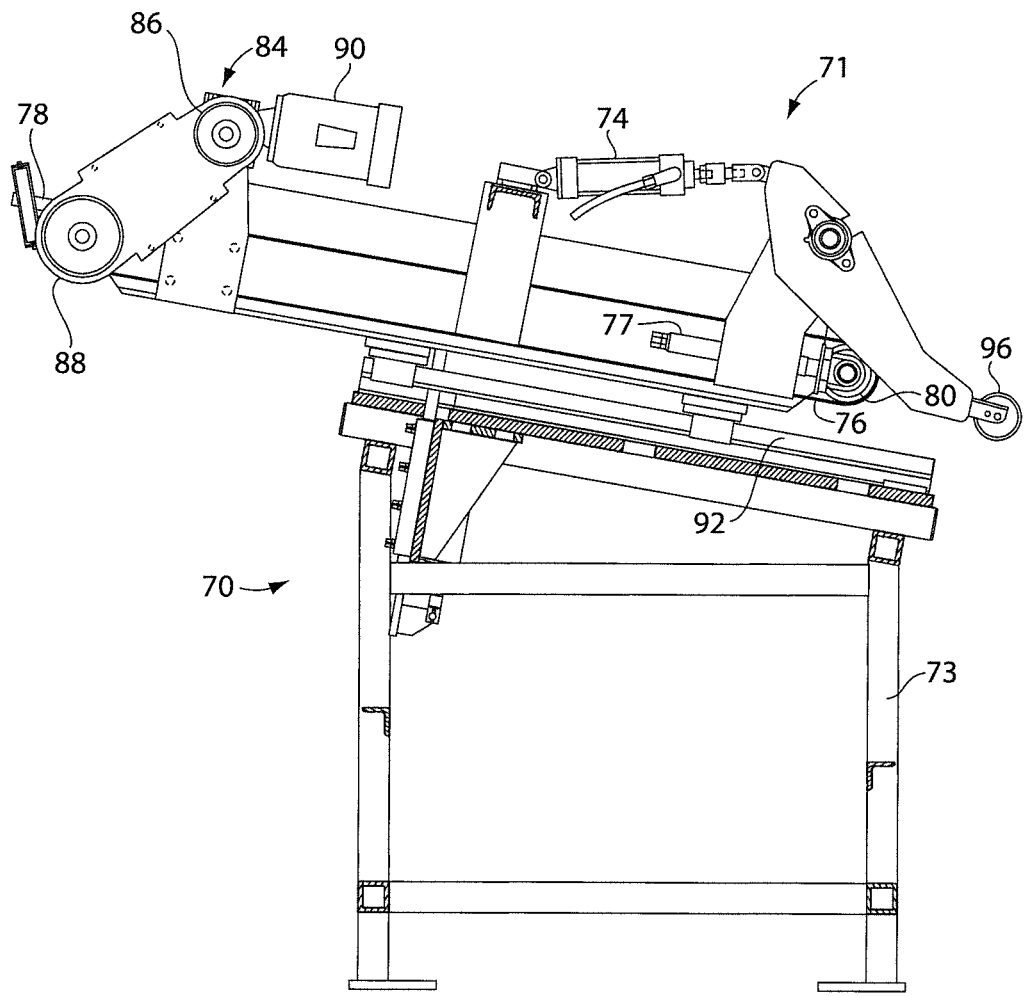

The conveyor belt 76 is mounted on two pulleys 80 and 82. The conveyor belt is typically mounted 10 degrees above horizontal but may be mounted at any angle that is convenient for operation. The tension in conveyor belt 76 may be adjusted using pulley adjustor 77 (FIG. 8). Pulley 82 is driven by drive assembly 84, which includes drive pulley 86, driven pulley 88, and motor 90 (FIG. 8). The strip cutting and removal assembly 71 slides forward and back (towards and away from front roll 14) on a linear bearing 92. Forward/reverse motion is actuated using a device such as a pneumatic cylinder 94 (FIG. 7). In an alternative embodiment, the conveyor belt 76 is stationary and only the starter blade 72 is actuated back and forth.

Figure 8A:
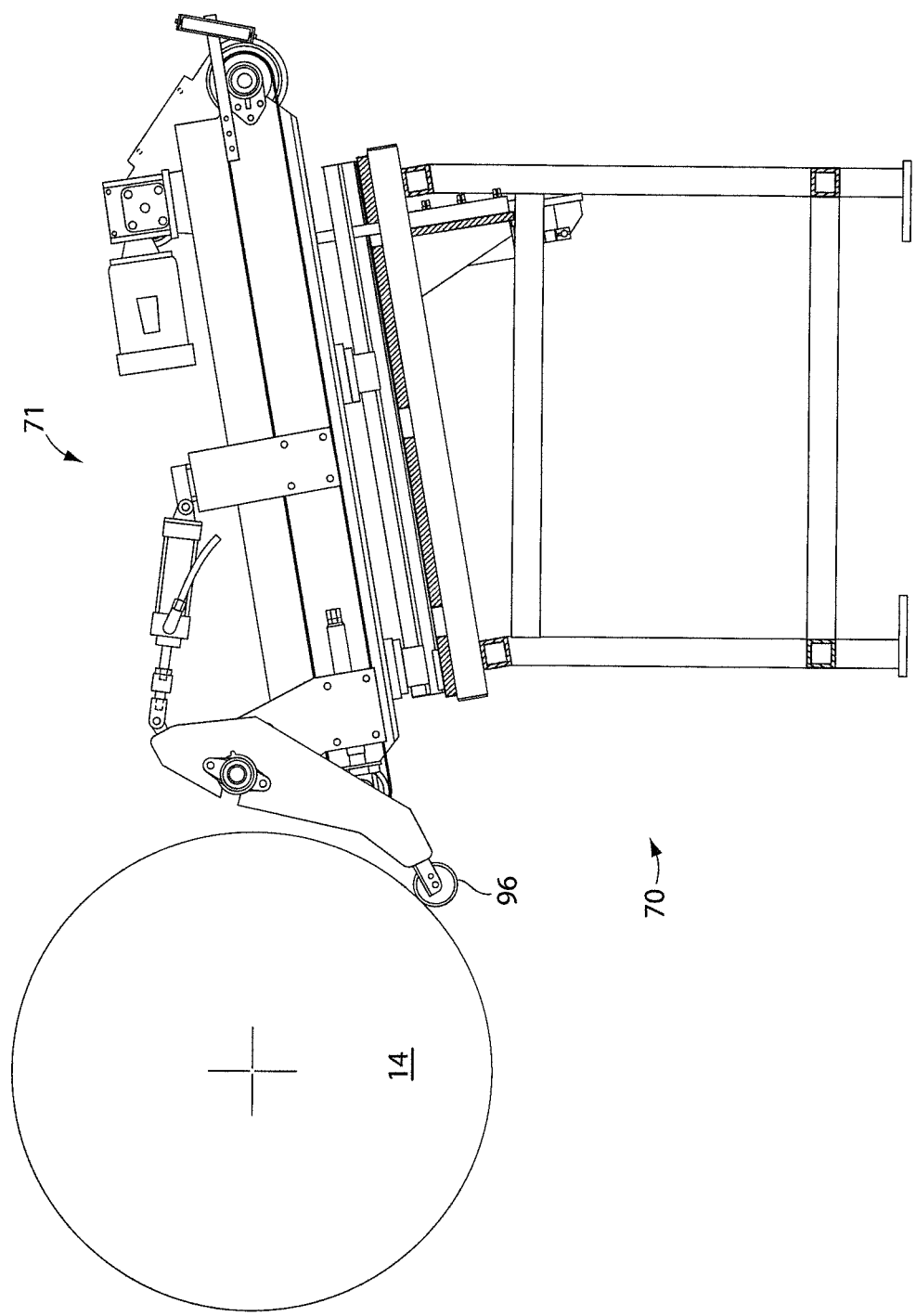
FIG. 8A shows a schematic of a portion of the strip cutting apparatus depicted in FIGS. 7 and 8 actuated against a two roll mill.

The starter blade 72 essentially makes a cut in a direction parallel to center axis 140 to define the end of the output strip 24. The transverse cuts (in a direction perpendicular to center axis 140) that define the sides of the strip 24 may be performed by the mill cutting knives 30 underneath front roll 14. As the front roll 14 continues to turn, the starter blade 72 peels the strip 24 away from the front roll 14 and directs the strip onto the conveyor belt 76 to begin removal of the output strip 24. The tip 72c of the starter blade 72 may be from about 0.5 to about 3 inches above conveyor belt 76. Alternatively or in addition, the tip 72c of the starter blade 72 may be disposed about 0.5 to about 3 inches laterally from conveyor belt 76. In both cases, there should be enough room for the strip 24 to peel away from front roll 14 and reach the conveyor belt 76 without jamming, but not so far away that the conveyor belt 76 cannot pull output strip 24 from the front roll 14. The conveyor belt 76 removes the output strip 24 as fast as it is peeled away from front roll 14. FIG. 7 shows an embodiment in which knives 96 that make the vertical cuts are mounted on the strip cutting and removal assembly 71; FIG. 8A shows knives 96 actuated against front roll 14. In this embodiment, such knives 96 are on a pivot that can be actuated forward and back by another pneumatic cylinder 74. However, this embodiment is optional and mill cutting knives 30 mounted on the roll mill 10 according to configurations familiar to those of skill in the art may be used to make the vertical cuts. The knives should be spaced widely enough that the starter blade 72 fits within the vertical cut lines of the mill cutting knives 30. In one embodiment, the width of starter blade 72 is about 2 mm less than that of output strip 24.

Once removal of output strip 24 starts, the starter blade 72 can be left in the advanced (roll contacting position) or retracted. If it is retracted, the output strip 24 will continue to be removed from the front roll 14 until the next time it breaks, whereupon the cycle may be repeated. The starter blade 72 may be retracted from about 5 inches to about 12 inches from the surface of front roll 14.

The surface velocity of conveyor belt 76 should be matched to the surface velocity of front roll 14 and the speed at which output strip 24 leaves front roll 14. One of skill in the art will realize that the length of conveyor belt 76 may be customized depending on the configuration of downstream equipment. One of skill in the art will further recognize that, although the automatic strip cutter 70 has been described with reference to a two-roll mill, it may also be configured for use with a calendaring mill. In general, the configuration of the starter blade should be adjusted to be parallel to the axis of the mill, and the remaining components of the automatic strip cutter 70 should be adjusted accordingly.

The present invention will be further clarified by the following examples which are intended to be only exemplary in nature

EXAMPLES

Example 1—Production of an Elastomer Composite

A wet masterbatch was produced by impacting a stream of natural rubber latex with a relatively higher velocity stream (75 m/s) of a carbon black slurry (namely, Vulcan 7H carbon black from Cabot Corporation at 10-15% by weight in water). The coagulated masterbatch crumb, which contained about 80 wt % water, was then dewatered (DW) to about 15 wt % water using a dewatering extruder (French Oil Mill Machinery Company, Piqua, Ohio). In the extruder, the masterbatch crumb was compressed, and water squeezed from the crumb was ejected through a slotted barrel of the extruder. The resulting dewatered coagulum was dropped into a continuous compounder (Farrel Continuous Mixer (FCM), Farrel Corporation, Ansonia, Conn.) for mastication and drying. An antioxidant, 6PPD, was added to the FCM at a rate such that the resulting concentration in the resulting masticated masterbatch was 1.0 phr. The moisture content of the masticated masterbatch exiting the FCM was around 1-2%. The masticated masterbatch was further masticated and cooled on an open mill as described in the Examples below, forming a dried elastomer composite. The dried elastomer composite was cooled and stored at ambient temperature. Dried elastomer composite was compounded in a 1.6 L Banbury mixer using the formulation in Table 1 and the compounding procedure given in Table 2. After each Banbury mixing stage, compounds were sheeted on a 2-roll mill operated at ambient temperature and about 40 rpm with a nip gap of about 2 mm using 4 cross-cuts and 2 end-rolls, with a rest time between from 4-6 hours stage 1 and stage 2 mixing. Vulcanization was carried out in a heated press set at 150° C. for a time determined by a conventional rubber rheometer (i.e., T90+10% of T90, where T90 is the time to achieve 90% vulcanization).

TABLE 1

|  | Parts by weight |
| --- | --- |
| Natural Rubber | 100 |
| Carbon black | variable |
| Stearic acid | 2.5 |
| Zinc oxide | 3.0 |
| 6-PPD* | 2.0 |
| Sulfur | 1.2 |
| CBS** | 1.2 |

*N-(1,3-dimethylbutyl)-N'-phenyl-p-phenylenediamine (Flexsys, St. Louis, MO)
**Cyclohexyl benzothiazole sulfonamide, (Akrochem, Akron, OH)

TABLE 2

| Stage 1 |  |
| --- | --- |
| Fill factor (%) | 70 |
| Rotor speed (rpm) | 80 |
| Start temperature (° C.) | 60 |
| Time Masterbatch addition (s) | 0 |

TABLE 2-continued

| Time smalls addition (s) | 60 |
| --- | --- |
| Time for sweep (s) | 90 |
| Dump time (s) | 150 |
| Stage 2 |  |
| Fill factor (%) | 65 |
| Rotor speed (rpm) | 60 |
| Start temperature (° C.) | 50 |
| Time masterbatch and curatives (s) | 0 |
| Time for sweep (s) | 30 |
| Dump time (s) | 60 |

Rebound (Zwick) was measured at room temperature on vulcanized samples according to ASTM method D7121-05. Mooney viscosity on unvulcanized samples was measured according to ASTM method D1646-06. Bound rubber was measured as follows: A sample weighing 0.5 g+/−0.025 g is weighed and placed in 100 ml toluene in a sealed flask and stored at ambient temperature for approximately 24 hours. The toluene is then replaced with 100 ml fresh toluene and the flask is stored for 4 days. The sample is then removed from the solvent and air-dried under a hood at ambient temperature for 24 hours. The sample is then further dried in a vacuum oven at ambient temperature for 24 hours. The sample is then weighed and the bound rubber is calculated from the weight loss data. The tensile stress of vulcanized samples (T300 and T100) were measured according to ASTM standard D-412. Dynamic mechanical properties were determined using a dynamic strain sweep at 10 Hz and 60° C. Tan $\delta_{max}$ is taken as the maximum value of tan $\delta$ within this range of strains.

Example 2—Variation of Roll Mill Operating Conditions

All samples were processed on a 32"×100" two roll mill from Dalian Rubber and Plastics Machinery Co. Ltd., Dalian, China. Each experimental run started with an "acceptable" initial condition with masticated masterbatch thoroughly banded over the entire roll mill surface and with a uniform bank of a consistent height from run to run. This initial condition was established by admitting masticated masterbatch on the roll mill periodically and working the material on the roll by operator (manual) cutting and folding. Very little new material was admitted on the roll mill during the startup period.

When the desired initial condition was achieved, the strip cutters on the downstream portion of the mill were adjusted to achieve a strip width appropriate to match the removal rate with the steady state feed (input) rate for the run. The run was starting by simultaneously feeding masticated masterbatch to an input region of the mill and removing an output strip from the output region of the mill. The removal of strip was periodically timed for one minute intervals and weighed to confirm the correct removal rate. The strip cutters were adjusted as needed to achieve the desired removal rate.

Example 3—Location of Bank Guard, Variation of Nip Gap

This Example demonstrates how to optimize the location of the bank guard and the width of the nip gap to achieve acceptable operating conditions. Masticated masterbatch produced according to Example 1 was processed on the roll mill as described in Example 2 using the operating parameters set forth in Table 3, below. Examples 3A-3H were prepared with 50 phr of Vulcan 7H carbon black. Examples 3I-3K were prepared with 50 phr of Vulcan 10H carbon black.

TABLE 3

| Example | Friction Ratio | Coolant T (° C.) | Through-put (kg/hr) | Nip Gap (mm) | Bank Guard Location* | Bank Guard Depth** | Comments |
|---|---|---|---|---|---|---|---|
| 3A | 1.02 | 55 | 720 | 3.5 | 400 mm | 211 mm | Ran for 90 min until lump lodged in plate |
| 3B | 1.02 | 55 | 720 | 5 | 400 mm | 211 mm | Ran out of material before break |
| 3C | 1.02 | 55 | 720 | 3.5 | 400 mm | 203 mm | Some starvation but voids did not traverse plate |
| 3D | 1.02 | 55 | 720 | 3.5 | 400 mm | 195 mm | Some starvation but voids did not traverse plate |
| 3E | 1.02 | 55 | 720 | 3.5 | 500 mm | 185 mm | Strip broke after 20 min |
| 3F | 1.02 | 55 | 720 | 3.5 | 500 | 195 mm | Improved mobility wrt 3E |
| 3G | 1.02 | 55 | 720 | 5 | 500 mm | 185 mm | Strip break at 1 hour |
| 3H | 1.02 | 55 | 720 | 3,5 | 500 | 175 | No improvement in mobility |
| 3I | 1.02 | 55 | 640 | 3,5 | 500 | 175 | Bad material and voids traversed plate |
| 3K | 1.02 | 55 | 640 | 3.5 | 500 | 211 | No voids but did get starvation at strip |
| 3J | 1.02 | 55 | 640 | 5 | 500 | 211 | Operation good but upstream production difficulties curtailed run |

*distance upstream of output strip, measured from center of strip
**depth with respect to horizontal tangent at top of roll The results demonstrate that a wider nip gap was correlated with reduced strip breakage. For this compound, there is an optimum bank guard depth/nip gap combination. Voids were able to traverse the bank guard at a depth of 175 mm. With a 3.5 mm nip gap, a 211 mm deep bank guard did not allow voids to pass but also resulted in starvation of the strip, that is, material was removed from the roll mill faster than material was directed into the output region. At this throughput rate, a 5 mm nip gap and a 211 mm deep bank guard appears to provide optimum operation. At these conditions, we expected to operate for well over an hour without strip breakage; however, production difficulties upstream of the roll mill forced an end to operation.

Example 4—Variation of Friction Ratio and Temperature—Comparative Example

This Example shows how to adjust the friction ratio and coolant temperature of a roll mill to achieve acceptable operating conditions. Masticated masterbatch produced according to Example 1 with 50 phr Vulcan 7H carbon black (Cabot Corporation) was processed on the roll mill as described in Example 2 using the operating parameters set forth in Table 4, below. In all the Examples below, the roll mill was started up as described in Example 2, but an operator standing by the mill facilitated ingestion of new material by cutting flaps from the band and feeding them back into the nip. The nip gap was maintained at 7 mm in all runs. The resulting elastomer composite was cured as described in Example 1 and its mechanical properties measured. The results are also reported in Table 5.

TABLE 4

| Example | Duration (min) | Front Roll RPM | Back Roll RPM | Coolant Temp ° C. | Throughput kg/hr | Comments |
|---|---|---|---|---|---|---|
| 4A | 16 | 16 | 18 | 50 | 450 | |
| 4B | 30 | 16 | 18 | 50 | 400 | Minor bagging |
| 4C | 29 | 18 | 18 | 50 | 400 | No bagging, worse tearing |
| 4D | 18 | 14 | 18 | 50 | 400 | Severe bagging, stopped early |
| 4E | 25 | 14 | 16 | 50 | 400 | Bad but manageable bagging |
| 4F | 15 | 16 | 18 | 80 | 400 | Severe bagging, stopped early |
| 4G | 36 | 16 | 18 | 50 F/90 R * | 400 | No bagging, worse tearing |
| 4H | 27 | 14 | 18 | 50 F/90 R | 400 | Bad bagging |

* Different temperatures for front and rear rolls

Run durations significantly less than 30 min indicate that operational difficulties (e.g., bagging or tearing) occurred and that the run was discontinued. The results demonstrate that high roll temperatures, high friction ratios (rear roll faster), and low speeds are correlated with bagging. Lower friction ratios, low roll temperature, and high roll speed are correlated with reduced bagging but also increased tearing. The mechanical properties of the resulting vulcanizates (Mooney viscosity is measured after compounding before vulcanization) are listed in Table 5, below.

TABLE 5

| Example | Tan Delta Max (60° C.) | Rebound (%) | M300/M100 | Mooney ML(1 + 4)@100 C. |
|---|---|---|---|---|
| 4A | 0.158 | 53.1 | 6.9 | 75.4 |
| 4B | 0.164 | 54.5 | 6.85 | 79.5 |
| 4C | 0.144 | 54.5 | 6.55 | 78.8 |

TABLE 5-continued

| Example | Tan Delta Max (60° C.) | Rebound (%) | M300/M100 | Mooney ML(1 + 4)@100 C. |
|---|---|---|---|---|
| 4D | 0.163 | 52.6 | 6.82 | 75.4 |
| 4G | 0.173 | 53.7 | 6.86 | 77.2 |

The results show that changing roll mill operating parameters such as coolant temperature and friction ratio affects operability (e.g., bagging). However, product quality parameters are mostly unaffected. While optimization of coolant temperature and friction ratio improved operation in this Example; other variables had not been adjusted to the point where we were confident that the roll mill could be operated without manual intervention. Still, the results demonstrate that there is some degree of freedom to optimize operating parameters such as coolant temperature and friction ratio without sacrificing quality.

Example 5—Variation of Roll Speed

This Example shows how to adjust the surface velocity of the rolls of a two roll mill to achieve acceptable operation conditions. Masticated masterbatch produced using 50 phr of Vulcan 7H carbon black from Cabot Corporation as described in Example 1 was processed on the roll mill as described in Example 2 using the operating parameters set forth in Table 6, below. For Examples A and B, the bank guard was disposed 400 mm towards the input region from the center of the output strip, and the bank guard protruded 211 mm from a tangent plane 501 of the top of the roll mill (see FIG. 5A). In Comparative Example 5D, the roll mill was started up as described in Example 2 but operated thereafter using prior art manual techniques; an operator standing by the mill facilitated ingestion of new material by cutting flaps from the band and feeding them back to the mill. The resulting elastomer composite was cured as described in Example 1 and its mechanical properties measured. The results are also reported in Table 6.

TABLE 6

| | Example 5A | Example 5B | Example 5C | Comparative Example 5D |
|---|---|---|---|---|
| Front Roll Speed RPM | 21 | 19.5 | 14 | 14 |
| Rear Roll Speed RPM | 21.5 | 19.5 | 14 | 14 |
| Throughput kg/hr | 647 | 757 | 638 | 687 |
| Nip Gap mm | 5 | 6 | 6 | 3.7 input end; 3.5 output end |
| Comments | Ran for 120 min without breakage | Continuous operation; some loss of material to pan | Continuous operation, large losses of material to pan | Material cut and refed to mill at input region |
| Max tan delta (60° C.) | 0.186 | 0.176 | 0.173 | 0.183 |
| M300/M100 | 6.00 | 6.13 | 6.06 | 5.96 |
| M(1 + 4)@100° C. Compound Mooney Viscosity | 73.9 | 76.2 | 76.5 | 77.3 |

The results show that the roll mill may be operated in an automatic, unattended mode at a range of throughputs and roll speeds (e.g., Examples 5A-5C). The resulting elastomer composite exhibits mechanical properties comparable or even superior to material processed on a roll mill operated using traditional cutting and recycling techniques (Comparative Example 5D).

Example 6—Energy Input in Roll Mill

Figure 9A:
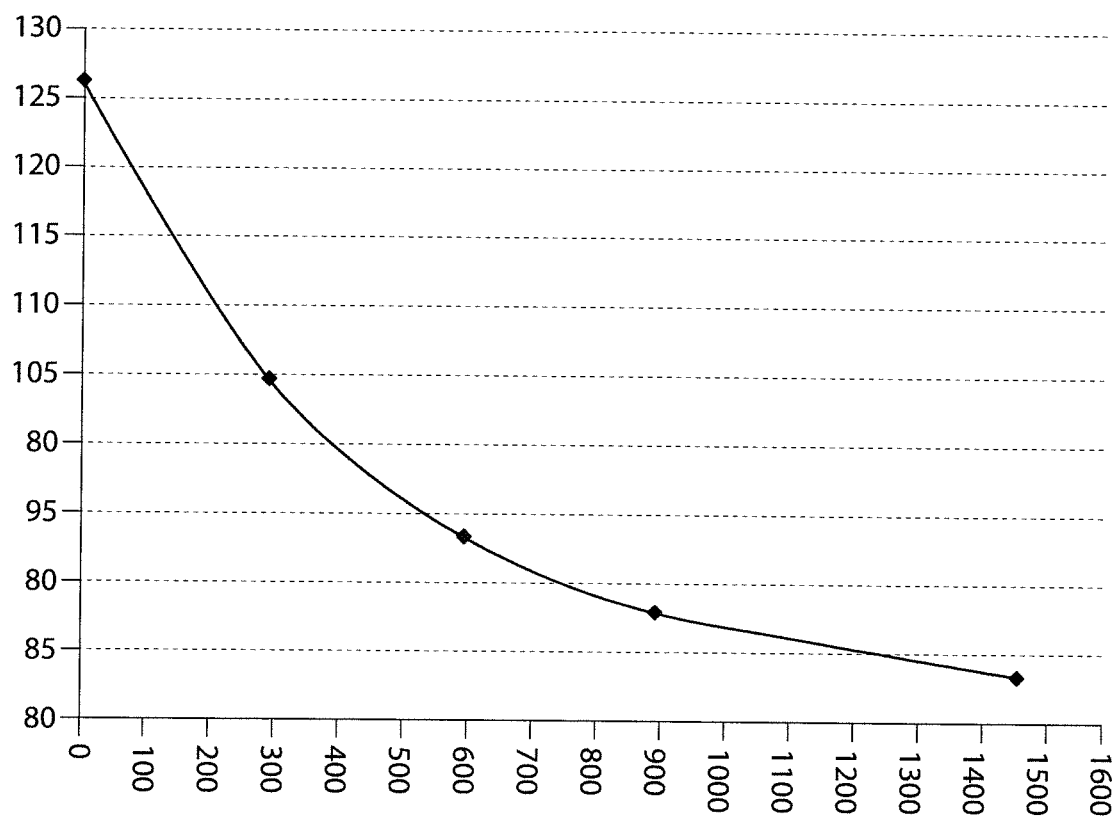
FIGS. 9A-C are graphs of Mooney viscosity, bound rubber, and rebound, respectively, with respect to the specific energy (kJ/kg) imparted to elastomer composite on a two-roll mill following mastication by a continuous mixer.
Figure 9B:
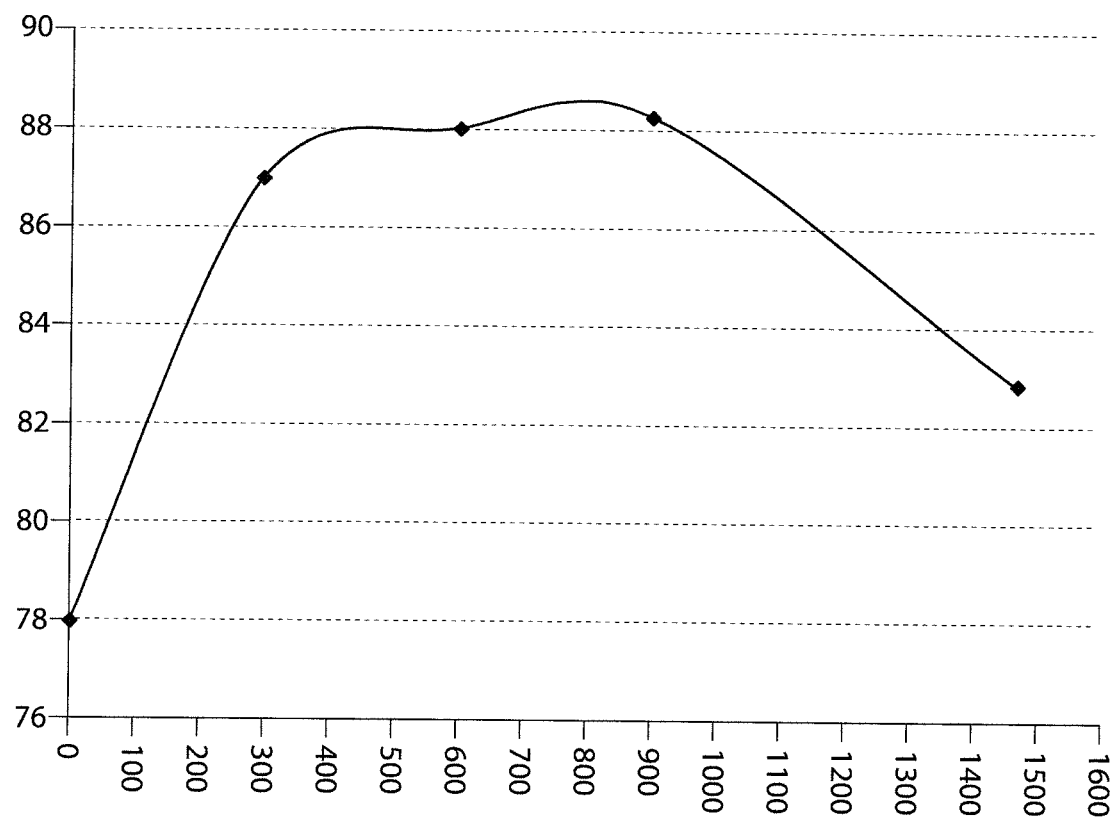
Figure 9C:
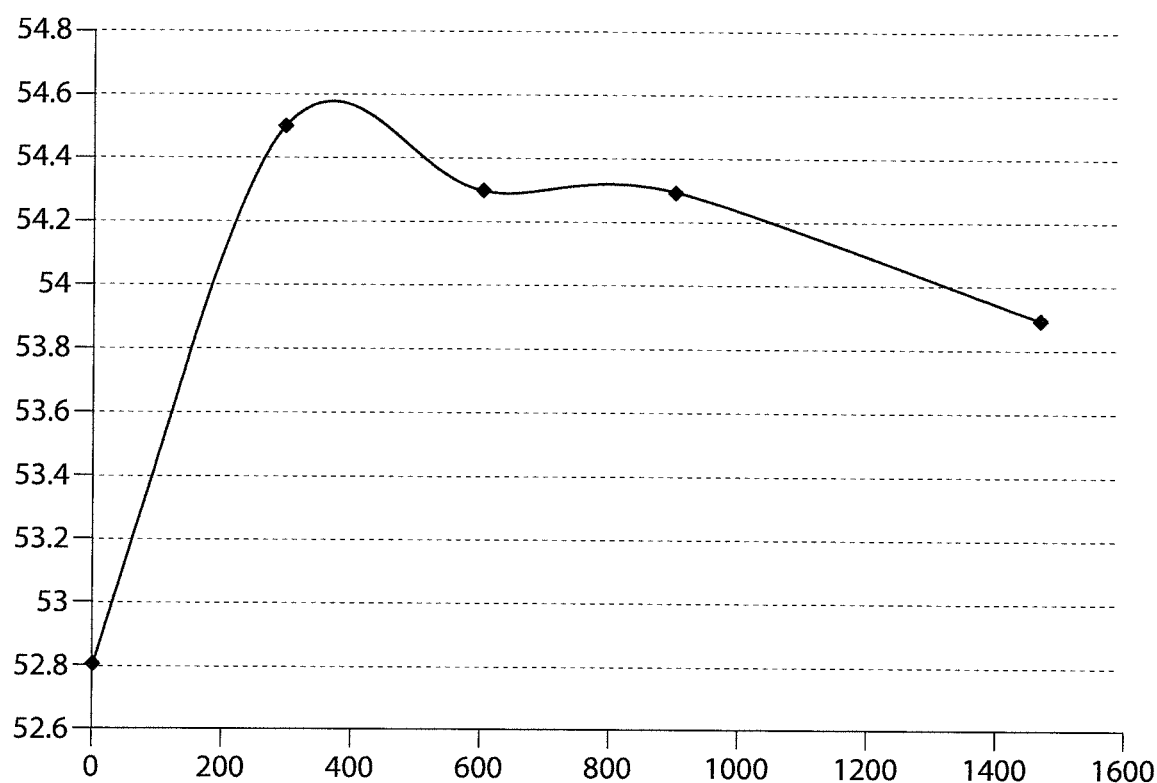

This Example demonstrates that there is a target range of specific energy that should be imparted by the roll mill to masticated masterbatch to optimize mechanical properties. Samples of about 30 kg of masticated masterbatch produced according to Example 1 (about 50 phr of Vulcan 7H carbon black) were collected from the FCM and weighed. The masticated masterbatch was ingested onto an empty roll mill and the energy input from the roll mill calculated using power meters connected to a LabVIEW data acquisition system (National Instruments Corporation, Austin, Tex.). Material falling through the nip was retrieved and re-ingested onto the roll mill until a band formed. Samples were retrieved from the roll mill after delivery of different amounts of specific energy (300, 600, 900, and 1500 kJ/kg); a control sample was retrieved from the FCM discharge (i.e., 0 kJ/kg). Samples were cooled in a water bath immediately after retrieval and tested as described elsewhere herein. FIGS. 9A-C show the variation of Mooney viscosity (ML (1+4)@100° C.), bound rubber (%), and Zwick rebound (% restored energy) with specific energy. Mooney viscosity decreases with increased specific energy, and the rate of decrease with respect to specific energy gradually levels. Bound rubber appears to reach a maximum between 300 kJ/kg and 900 kJ/kg of imparted energy from the roll mill. Rebound also reaches a maximum between 300 kJ/kg and 900 kJ/kg of imparted energy, exhibiting a decrease after additional mastication on the two-roll mill.

The foregoing description of preferred embodiments of the present invention has been presented for the purposes of illustration and description. It is not intended to be exhaustive or to limit the invention to the precise form disclosed. Modifications and variations are possible in light of the above teachings, or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. In a two-roll mill for processing viscoelastic material, the two-roll mill comprising first and second parallel rolls having a nip therebetween, the nip having a vertical dimension v defined by the distance from a center plane of the two-roll mill to a tangent plane of the two-roll mill, the nip further having a first horizontal dimension h defined by the distance between the rolls on the center plane and a second horizontal dimension defined by the distance between the first and second rolls on the tangent plane, the improvement comprising:

the two-roll mill further comprises a bank guard having first and second concave edges defining a protruding portion therebetween, the protruding portion having an edge, wherein the first and second concave portions are configured such that the first concave edge is disposed from 3 h to 5 h from a portion of the surface of the first roll disposed within the nip and the second concave edge is disposed a distance of about 3 to about 15 mm from a portion of the surface of the second roll disposed within the nip, and wherein the protruding portion extends into the nip towards the center plane to allow, during operation of the roll mill, advancement of viscoelastic material disposed between the center plane and the edge of the protruding portion past the bank guard; and the two-roll mill further comprising two knives disposed proximate to the first roll and configured to, during operation of the two-roll mill, cut an output strip of viscoelastic material disposed on the first roll, wherein the bank guard is spaced a predetermined distance from a plane perpendicular to the center plane and disposed midway between the two knives, and wherein the predetermined distance is from about 33% to about 90% of the diameter of the first roll.

2. In the two-roll mill of claim 1, wherein the bank guard further comprises a cutaway edge adjacent to the first concave edge, wherein a limit between the cutaway edge and the first concave edge defines an angle with the center plane and wherein the angle is from about 60 to about 90 degrees.

* * * * *